July 12, 1960 B. A. WEIDEMAN ET AL 2,944,573
APPARATUS FOR FILLING RECEPTACLES
Filed Feb. 11, 1957 4 Sheets-Sheet 1

INVENTORS
BERNARD A. WEIDEMAN
JEROME J. GROFF
BY John W. Michael
ATTORNEY

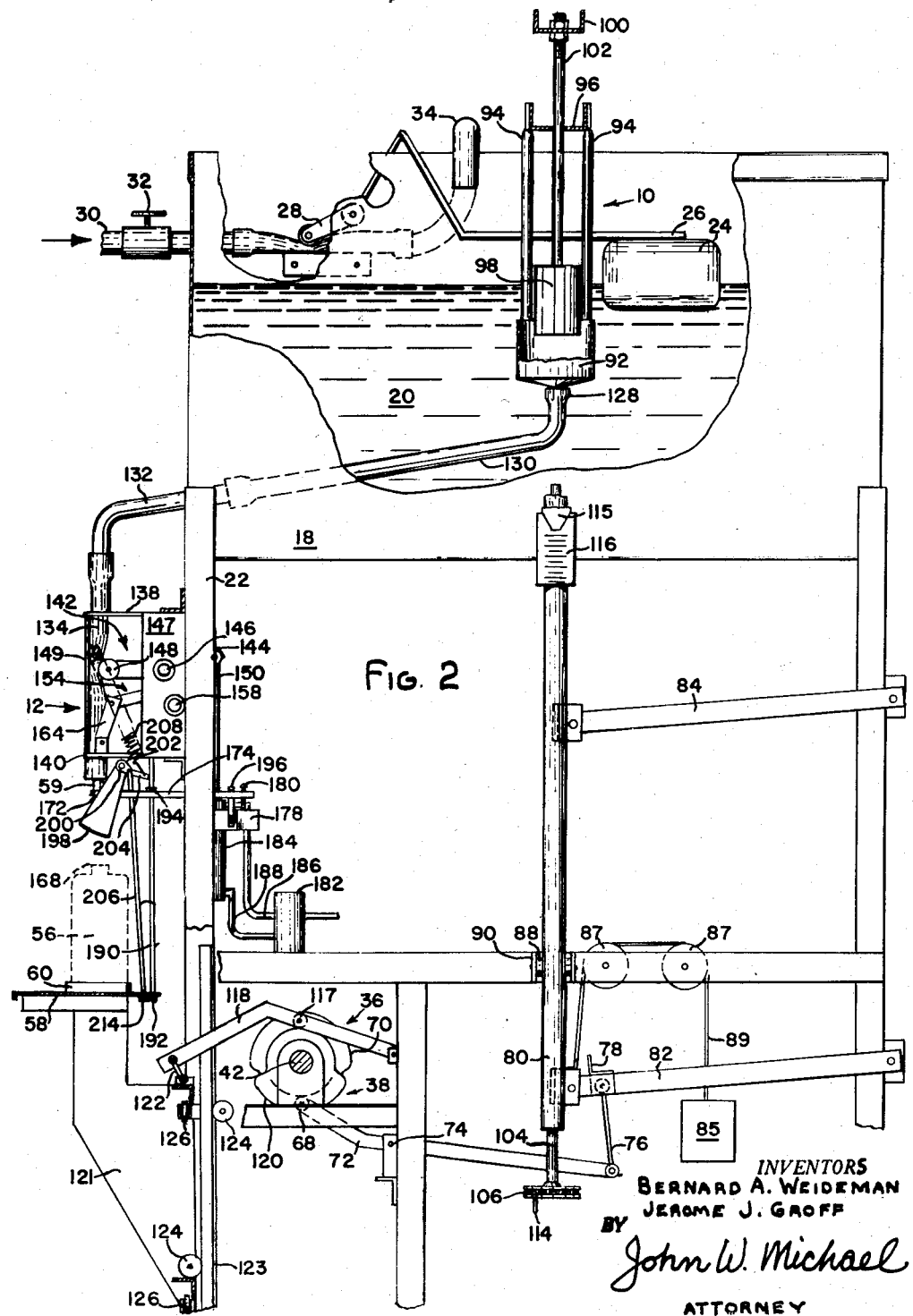

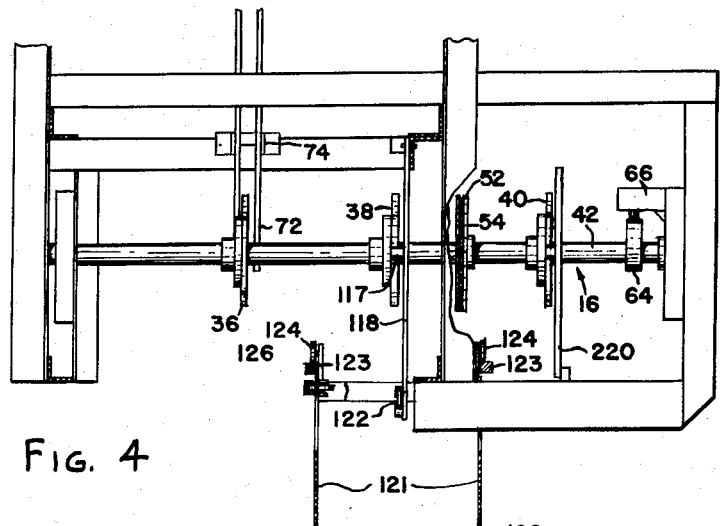
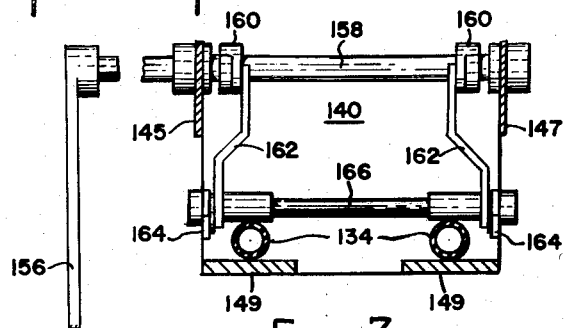
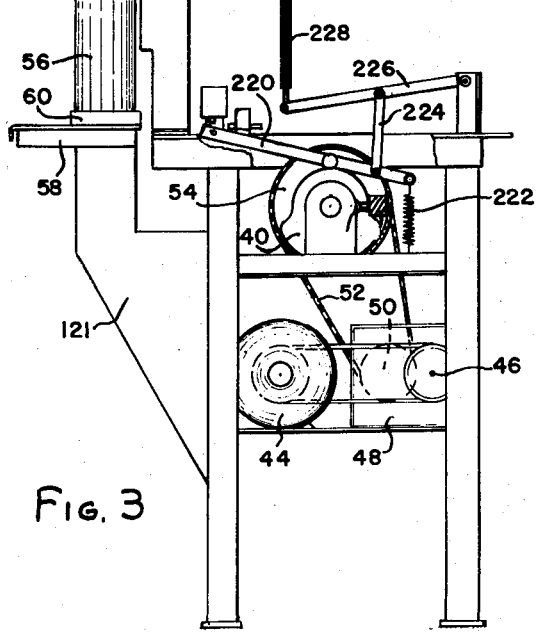
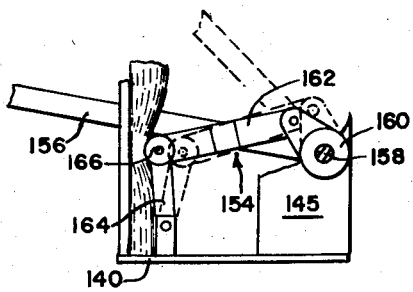

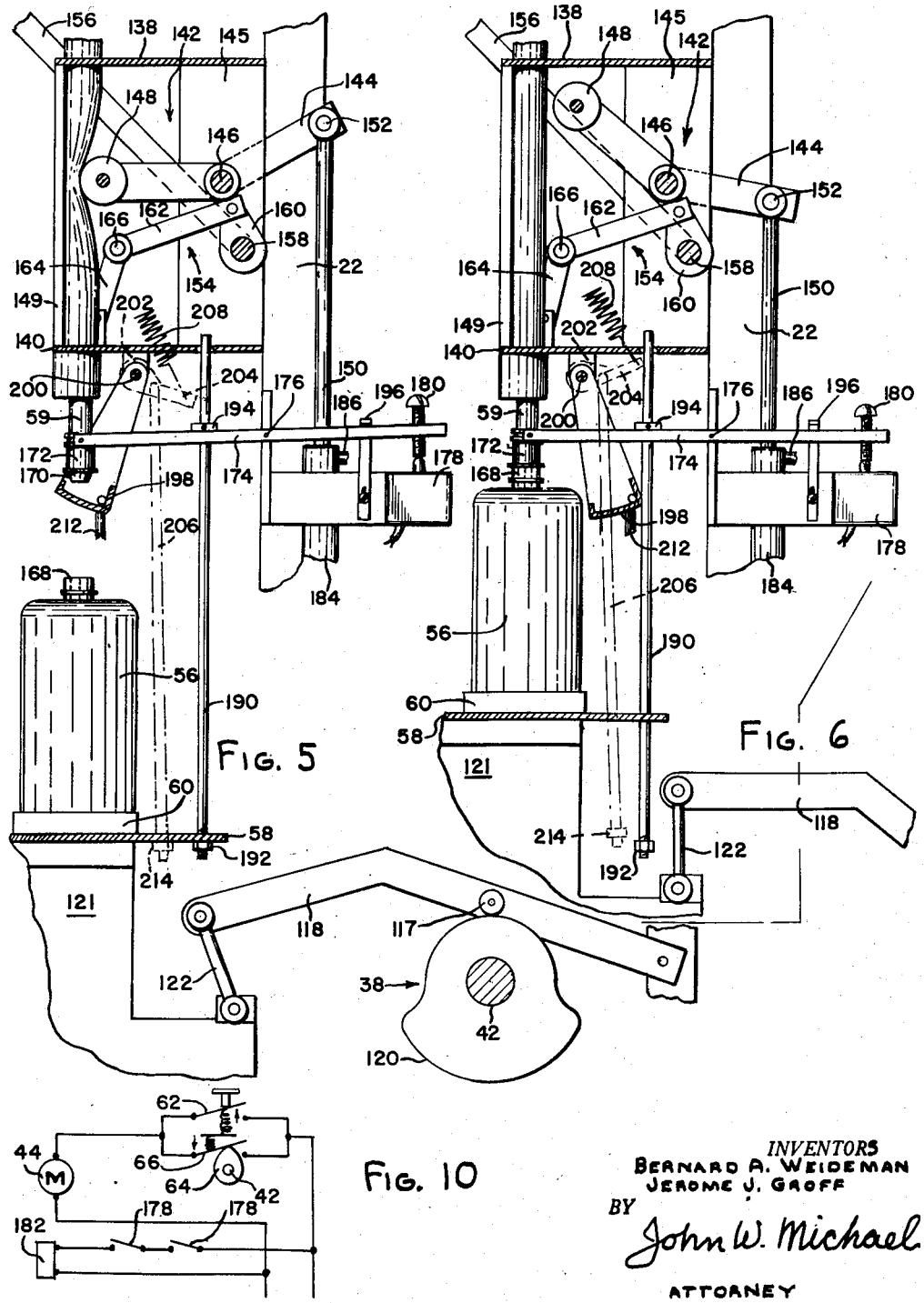

United States Patent Office
2,944,573
Patented July 12, 1960

2,944,573

APPARATUS FOR FILLING RECEPTACLES

Bernard A. Weideman, Sussex, and Jerome J. Groff, Milwaukee, Wis., assignors to Globe-Union Inc., Milwaukee, Wis., a corporation of Delaware Filed Feb. 11, 1957, Ser. No. 639,322

16 Claims. (Cl. 141—87)

This invention relates to apparatus for filling receptacles with acid and other liquids which for reasons of safety or cost or both it becomes important to fill accurately without exposing the operator to the liquid and with a minimum of loss due to spillage.

The apparatus shown and described herein was designed for filling receptacles with the exact amount of battery electrolyte required for a cell of a storage battery of a specific size for shipment to widely scattered locations to fill batteries which have been shipped dry from the factory. It is desirable to use plastic receptacles for this purpose, which, because of their collapsible walls, makes it impossible to use the standard vacuum type of filling machine. Furthermore, because the receptacles are not always uniform in volume they cannot be accurately filled by measuring the level of the liquid in the receptacle. This apparatus, therefore, must be of the gravity flow type provided with means for safely and accurately dispensing a predetermined amount of liquid into each receptacle.

It is an object of this invention, therefore, to provide apparatus of the type described which is accurate and safe.

Another object is to provide means for easily and accurately adjusting the amount of liquid dispensed into each receptacle.

Another object is to provide apparatus which will quickly and economically fill the receptacles as set forth above.

These objects are attained by utilizing a supply tank for liquid into which a measuring cup with an adjustable displacement member is submersed and withdrawn to accurately fill such cup. The amount in the cup is determined by adjusting the position of the displacement member in the cup. After the cup is withdrawn, liquid flows from the cup to a filling spout automatically controlled by a pneumatically operated valve. A platform carries the receptacle up to and down from the filling spout. As it moves up it permits a swingable trough to move by bias from beneath the spout where it collects any liquid which leaks or drips therefrom. As it moves down it swings the trough back to a position beneath the spout. The valve is automatically opened after the receptacle is moved into proper position beneath the spout and raises a slidable collar on the filling spout. If there is no receptacle on the platform the valve will not open. The platform has a connection with the collar to pull it down as the platform moves down thereby preventing sticking of the collar in the up position, thus insuring closure of the valve when the receptacle is lowered from the filling spout.

The means for submersing and withdrawing the measuring cup and for raising and lowering the receptacle platform includes cams mounted on a rotating shaft and timed so that the cup is filled and raised before the receptacle actuates the control collar for the valve and the receptacle lowered and the valve closed before the cup is refilled.

Other objects and advantages will be pointed out in, or be apparent from the specification and claims, as will obvious modifications of the embodiment shown in the drawings, in which:

Fig. 2 is a section taken along lines 2—2 of Fig. 1;

Fig. 3 is a fragmentary side elevation showing the capping apparatus;

Fig. 4 is a sectional view taken along line 4—4 of Fig. 1;

Fig. 5 is a section taken along line 5—5 of Fig. 1 showing the platform which carries the receptacles in the down or start position;

Fig. 6 is the same view as Fig. 5 with the platform in the up or filling position;

Fig. 7 is a section taken along line 7—7 of Fig. 1 showing the construction of the manually operated valve;

Fig. 8 is a fragmentary side elevation of the structure shown in Fig. 7;

Fig. 10 is a schematic wiring diagram showing the switches for starting and stopping the apparatus and the switches for energizing the solenoid which control the operation of the valves in the conduits from the measuring cups to the filling spouts.

Figure 1:
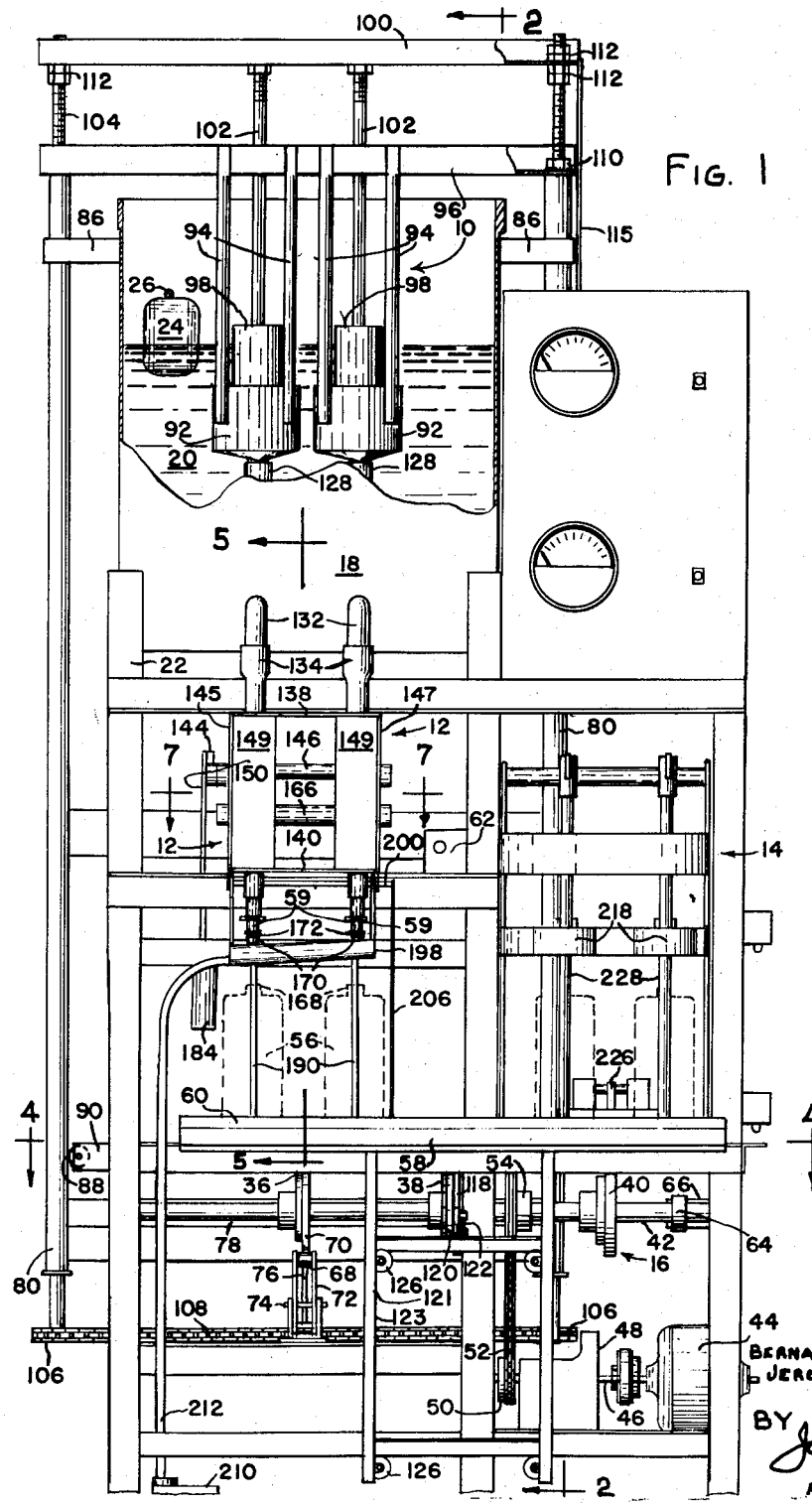
Fig. 1 is a front elevation of the apparatus in the start position.

The apparatus shown in the drawings, as presently to be described, was designed for filling receptacles with battery electrolyte. Although receptacles of various shapes and materials can be filled by this apparatus, plastic receptacles are used since they are impervious to the acid in the electrolyte and are rugged and strong to withstand rough handling in shipment. The volume of the plastic receptacles is not uniform due to the flexible material with which they are made and dents and indentations often present in the walls. This makes it impossible to accurately fill the receptacles by merely filling them to a particular level. It becomes necessary instead to provide means for accurately measuring an amount of liquid and dispensing it into the receptacles to be filled.

Referring to Fig. 1 of the drawings, the apparatus consists generally of an adjustable measuring means 10 which accurately measures each fill, a filling means 12 which raises and lowers the receptacles to and from the filling position and dispenses the measured liquid into the receptacles, a capping means 14 which automatically seals the receptacles, and cam shaft means 16 which actuates the above mentioned means in a predetermined sequence. A tank 18 containing a liquid 20 is mounted in a frame 22. The liquid level in the tank is maintained by a float 24 operatively connected by an arm 26 to a squeeze-type valve 28 which controls liquid flowing from an inlet conduit 30 through a manual shut-off valve 32 and a conduit 34 which empties into the tank.

Measuring means 10, filling means 12, and capping means 14 are actuated by cams 36, 38 and 40, respectively, on shaft 42 rotatably mounted in frame 22. The shaft is driven by an electric motor 44 through an output shaft 46, reducing gearings 48, a sprocket wheel 50, a chain drive 52, and a sprocket wheel 54 fixed to shaft 42. Before the apparatus is started a pair of empty receptacles 56 are placed on a platform 58 by the operator and positioned thereon directly beneath filling spouts 59 by means of a guide ridge 60 on the platform. Motor 44 is started by closing starting switch 62 (normally open) and holding it closed until cam 64 (Fig. 4) rotates a sufficient amount to close a switch 66 (normally closed)

which maintains motor operation after the starting switch 62 is allowed to open (see Fig. 10).

Shaft 42 rotates clockwise as viewed in Fig. 2, which shows the apparatus in starting position. It is noted that in starting position the measuring means 10 is submerged in liquid 20 and platform 58 is in the down position. Rotation of the shaft 42 will initially cause a cam follower 68 to ride up on a surface 70 of a cam 36 mounted on the shaft. This will pivot an arm 72 about a point 74 causing a link 76 to actuate a channel 78 upwardly. Channel 78 imparts axial reciprocal movement to tubes 80 fastened to the channel and mounted on each side of the frame. This upward movement of channel 78 is imparted to tubes 80 through arms 82 pivotally mounted at one end to the frame and at the other to the lower portion of tubes 80. Another pair of arms 84, similar to arms 82, are pivotally mounted to the frame at one end and pivotally connected to the upper portion of the tubes at the other to stabilize the axial movement of the tubes. Tubes 80 are guided at their upper ends by guides 86 fastened to tank 18 and at their lower portions by rollers 88 rotatably mounted in brackets 90 fastened to frame 22. A counterweight 85 connected to one of the tubes 80 over pulleys 87 by a cord 89 exerts an upward force on the tubes to counteract part of the weight of the tubes and the structure carried thereby to reduce the amount of force required to actuate the tubes.

A pair of submersible measuring cups 92 are suspended into the open top of the tank by rods 94 fastened to a horizontal channel member 96 which, in turn, is fastened to tubes 80. Movement of the measuring cups 92 below the surface of liquid 20 and then out again to accurately fill the cups is accomplished by the reciprocal axial movement of tubes 80 actuated by cam 36 on shaft 42 as previously described.

Figure 9:
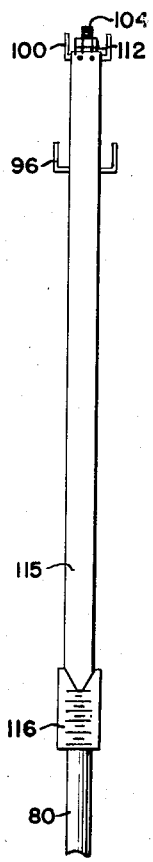
Fig. 9 is a fragmentary side elevation of the apparatus showing the means for indicating the capacity of the adjustable measuring cups.

Displacement members 98 are slidably mounted in the open mouth of each measuring cup 92 and are suspended from a horizontal channel member 100 by rods 102. The capacity of the measuring cups can be varied by moving displacement members 98 in and out of the mouth of each cup. This is accomplished by relative axial movement of tubes 80 and rods 104 connected to horizontal channel members 96 and 100, respectively. Tubes 80 are adapted for telescopic engagement with rods 104. The lower ends of tubes 104 protrude from tubes 80 and are fitted with sprocket wheels 106 interconnected by a chain 108 to provide joint rotation of rods 104. The upper ends of rods 104 are threaded to provide an adjustable connection with horizontal member 96 by means of nuts 110 welded to the horizontal members. Rods 104 pass through horizontal member 100 and are loosely connected thereto by a pair of locked nuts 112 threaded on rods 104 on either side of member 100 in a manner to permit relative rotation of rods 104 with horizontal member 100. By rotating one sprocket wheel 106 by means of a handle 114 (Fig. 2) the rods 104 can be raised or lowered with respect to channel member 96 to thereby vary the position of displacement member 98 in cups 92 which, in turn, will vary the capacity of the cups. An indicator strip 115 (Fig. 9) fastened to one end of channel member 100 and overlying a calibrated scale 116 fastened to one tube 80 serves to indicate the position of displacement member 98 in cups 92 and thereby indicates the capacity of the cups to provide accurate adjustment thereof.

Continued clockwise rotation of shaft 42 will cause a cam follower 117 rotatably mounted on an arm 118 to ride up on a surface 120 of a cam 38 on the shaft to thereby move platform 58 from the position shown in Fig. 5 to that shown in Fig. 6. Platform 58 is actuated by cam 38 through arm 118 pivoted at one end to the frame and pivotally connected at the other to a bracket 121 through a link 122. Platform 58 is mounted on a pair of supporting brackets 121 which ride up and down on angle members 123 by means of rollers 124 mounted on the supporting brackets (Fig. 2). Tilting of platform 58 from side to side is prevented by another set of rollers 126 rotatably mounted on brackets 121 (Fig. 1) which also ride up and down on angle members 123.

Outlets 128 in measuring cups 92 are connected by flexible conduits 130, bends 132, short sections of flexible conduit 134 to filling spouts 59 mounted in plates 138 and 140 fastened to the frame. Empty receptacles 56 are carried up to and down from the filling spouts 59 by platform 58 actuated by cam 38 as previously explained. The flow of liquid from the measuring cups 92 to the filling spouts 59 is controlled by squeeze-type valves 142 (Figs. 5 and 6) comprising offset arms 144 fixedly mounted on a rod 146 pivotally mounted in side plates 145 and 147 which together with top and bottom plates 138 and 140, respectively, and front plate 149 form a housing for the valves 142. Rollers 148 are rotatably mounted at one end of each arm 144. Arms 144 are actuated by a rod 150 pivotally connected by a pin 152 to the other end of one arm whereby rollers 148 are moved in and out of engagement with flexible conduit sections 134 to control flow therethrough.

Manually operated squeeze-type valves 154 (Figs. 7 and 8) are provided and include a handle 156 which actuates a rod 158 pivotally mounted in plates 145 and 147. Pivotal movement of rod 158 actuates arms 160 and links 162 and 164 which, in turn, move a rod 166 in and out of engagement with flexible conduit sections 134 to pinch off or permit flow therethrough, as desired.

Valves 142 are normally closed to prevent flow from the measuring cups to the filling spouts. As platform 58 is moved upwardly toward the filling spouts by cam 38, edge surfaces 168 on the neck of each receptacle contact a shoulder 170 on a collar 172 slidably mounted on each filling spout 59 to thereby move the collars from the position shown in Fig. 5 to that shown in Fig. 6. Pivot arms 174 operatively connected to collars 172 and pivoted at points 176 close switches 178 through adjustable screws 180 (Fig. 6) when the collars are pushed up. Switches 178 control a solenoid valve 182 which, in turn, controls the operation of a pneumatic ram 184 by alternately allowing air pressure to be exerted on one or the other side of the pneumatic ram through conduits 186 and 188. Pneumatic ram 184 actuates rod 150 when switches 178 are closed to move rollers 148 out of engagement with conduits 134 and thereby allow the liquid in the measuring cups to flow into the receptacles. As shown in the wiring diagram in Fig. 10, solenoid 182 is not energized unless both switches 178 are closed. This means that valves 142 are opened only when both collars 172 are moved upwardly by receptacles thereby preventing flow of liquid from either spout unless there are receptacles in place under both spouts to receive it.

As an extra safety precaution to insure closure of valves 142 in case collars 172 may stick in the up position, rods 190 slidably mounted in platform 58 are provided. Nuts 192, threaded on the ends of rods 190, are engaged by the bottom surface of the platform as it reaches the limit of its downward travel to move arms 174 by means of lugs 194 on the rods and thereby insure opening of switches 178. An adjustable stop 196 is provided to limit the upward movement of the righthand portions of arms 174 to prevent collars 172 from sliding off the end of spouts 59.

To collect liquid which may drip from the filling spouts, a swingable trough 198 is provided. Trough 198 is pivotally mounted by a pin 200 in brackets 202 fastened to the bottom of plate 140 and adapted to swing in and out from beneath the spouts as a lever arm 204 connected to the trough is actuated by a rod 206 which swings the trough beneath the spouts against the bias of a spring 208 fastened to the end of lever 204. The trough 198 is inclined horizontally and communicates with a container 210 through a conduit 212 connected to the lower end of the trough to recover the liquid collected by the trough. As platform 58 is moved upwardly toward the filling spouts, rod 206 and lever arm 204 are allowed to moved upwardly under the bias of springs 208 thereby causing the trough 198 to swing out from beneath the filling spout from a position shown in Fig. 5 to that shown in Fig. 6. After the receptacles are filled the platform 58 is moved down by cam 38 and will engage nut 214 on rod 206 and swing trough 198 back underneath the filling spouts to collect any liquid which continues to drip from the spouts after valve 142 is closed.

Continued clockwise rotation of shaft 42 after platform 58 has been lowered by the action of cam 38 will result in downward movement of tubes 80 as cam follower 68 on arm 72 moves off the cam surface 70 of cam 36 to return the measuring means 10 to the submerged or start position. By this time, shaft 42 has made one complete revolution moving cam 64 back in contact with switch 66 to open the switch and stop the motor.

The capping apparatus 14 for sealing the stopper in the receptacles after they have been filled is mounted on the righthand portion of the frame as viewed in Fig. 1. Since this structure forms no part of the present invention, it will be described only to the extent necessary to clearly disclose the overall operation of the machine. The filled receptacles are shifted over to the righthand portion of the platform 58 and plastic stoppers 216 are placed on the open necks of the receptacles (Fig. 3) before the machine is started. The filled receptacles are raised by platform 58 along with the empty receptacles as previously described. Cam 40, mounted on shaft 42, actuates a pivot arm 220 against the bias of a spring 222 connected to one end of the arm. The upward movement of arm 220 by cam 40 actuates inverted cup-like members 218 through a link 224, arms 226, rods 228, and arms 230 to lower members 218 while the empty receptacles are being filled. Inverted cups 218 push the stoppers 216 against edge surfaces 168 on the necks of the receptacles. A blast of hot air is directed to the neck and stopper through the cups to slightly melt the plastic therein and make a tight seal.

*Operation*

To review briefly one complete filling and capping operation, the two receptacles that have been filled in the previous cycle are shifted manually to the capping position and plastic stoppers are inserted in the necks. Two empty receptacles are then positioned on the platform in the filling position. The motor is started by closing normally open switch 62 which is held closed until cam 64 on shaft 42 rotates a sufficient amount to allow normally closed switch 66 to close the motor circuit and thereby maintain motor operation after starting switch 62 is opened (Fig. 10). Rotation of shaft 42 will first cause cam 36 to actuate arm 72 thereby moving tubes 80 up to withdraw measuring cups 92 out of the liquid. The capacity of the measuring cups can be accurately adjusted by varying the position of displacement members 98 in the cup to provide the exact amount of liquid required in the particular filling operation being run.

Further rotation of shaft 42 will cause cam 38 to actuate arm 118 to raise platform 58 and the empty and filled receptacles carried thereby up toward the filling spouts and capping apparatus, respectively. As the platform moves up, swingable trough 198 swings out from beneath the filling spouts under the bias of spring 208. The necks of the empty receptacles will push collars 172 upwardly on filling spouts 59 closing switches 178 which, in turn, will energize solenoid valve 182 and direct air pressure to pneumatic ram 184 which actuates rod 150 to open squeeze valves 142 and thereby allow liquid in the measuring cups to drain into the empty receptacles. As the empty receptacles are being filled cam 40 actuates the capping apparatus 14 to seal the stoppers in the filled receptacles. Cam 38 is designed with respect to the speed or rotation of shaft 42 to hold the platform in the up position a sufficient length of time to fill the empty receptacles and seal the filled receptacles. Continued rotation of the shaft results in cam follower 117 moving down off of surface 120 of cam 38 to lower platform 58 back to the start or down position. Switches 178 open and valves 142 are closed. As the platform is lowered, it will engage nut 214 on rod 206 and swing trough 198 against the bias of spring 208 back underneath the filling spouts to collect any liquid which continues to drop therefrom after valve 142 is closed. Continued clockwise rotation of the shaft will cause downward movement of tubes 80 as cam follower 68 on arm 72 moves off the cam surface 70 of cam 36 to return the measuring means 10 to the submerged or start position. By this time the shaft has made one complete revolution bringing cam 64 back in contact with switch 66 to open the switch and stop the motor.

Although but one embodiment of the present invention has been illustrated and described, it will be apparent to those skilled in the art that various changes and modifications may be made therein without departing from the spirit of the invention or from the scope of the appended claims.

We claim:
1. Apparatus for filling receptacles comprising, a supply tank, a pair of spaced tubes movably guided outside of said tank, a member over said tank connected to each of said tubes, a measuring cup suspended from said member and movable up and down in said tank with said tubes, means for moving said tubes, a pair of rods adjustably connected to said tubes, a bridging member interconnecting said rods, a displacement member secured to said bridging member and partially in said cup, and a controlled outlet for said cup.

2. Apparatus according to claim 1 in which there is threaded means adjustably connecting said rods and tubes.

3. Apparatus according to claim 2 in which said threaded means are interconnected for joint adjustment.

4. Apparatus for filling receptacles comprising, a cup, an outlet in said cup, a filling spout, conduit means connecting said outlet and said filling spout, a valve to control flow of liquid from said spout, a trough mounted to move beneath said spout and biased to move out from beneath said spout, means for raising and lowering a receptacle up to and away from said spout, said means having a lost-motion connection with said trough to move said trough beneath said spout when said receptacle is lowered.

5. Apparatus according to claim 4 in which said trough is pivotally mounted and biased to one side of said spout and said means for raising and lowering said receptacle includes a platform for a receptacle, there being a rod operatively connecting said trough to said platform to swing said trough to a position beneath said spout against said bias as said platform moves down.

6. Apparatus according to claim 4 in which there are means for opening said valve as said means for raising and lowering a receptacle moves a receptacle up to said spout and for closing said valve when said means moves a receptacle out of filling position.

7. Apparatus for filling receptacles comprising, a frame, a tank mounted on said frame containing a supply of liquid, a measuring cup movable in said tank, means for moving said cup in and out of said liquid to fill it, an outlet from said cup, a filling spout mounted on said frame, a conduit connecting said outlet and said filling spout, a valve in said conduit to control flow of said liquid from said spout, a receptacle to be filled, means for raising and lowering said receptacle up to and away from said spout, means for opening and closing said valve as said receptacle is moved up to and away from said spout respectively, a member carried by said frame for up and down movement, said member actuated by said receptacle as said receptacle moves up to said spout, means controlled by said member to open said valve when said receptacle is moved up and to close said valve when said receptacle is moved down, and a lost-motion connection between said member and said means for raising and lowering said receptacle to move said member down as said receptacle moves down and thereby insure closure of the valve.

8. Apparatus according to claim 7 in which said means for moving said cup and said means for raising and lowering said receptacle are synchronized by rotating cams carried by a single shaft whereby said cup is filled before said receptacle is raised and said valve opened, and said receptacle is lowered and said valve closed before said cup is refilled.

9. Apparatus for filling a collapsible receptacle comprising a frame, a supply of liquid carried by said frame, a measuring cup carried by said frame for movement in and out of said supply, an outlet for said cup, a filling spout mounted on said frame, a flexible conduit connecting said outlet and said spout, a valve for closing said conduit, electrically controlled means including a switch for operating said valve, a vertically movable platform guided by said frame below said spout, a collapsible receptacle on said platform, a trough carried by said frame and movable from beneath said spout to one side thereof, a common rotating cam shaft, means operated by said shaft to lower and raise said cup, means operated by said shaft to raise said platform and lower said platform, lost motion means interconnecting said platform and said trough to move said trough beneath said spout as said platform is lowered, and a member movably carried by said frame and actuated by the top of said receptacle as raised by said platform into filling engagement with said spout, said member closing said switch to open said valve.

10. Apparatus for filling receptacles comprising, a supply tank, a tube movably guided outside said tank, a member over said tank fastened to said tube, a measuring cup suspended from said member and movable up and down in said tank with said tube, means for moving said tube, a rod adjustably connected to said tube, a second member over said tank fastened to said rod, and a displacement member supported from said second member and extending into the open end of said cup.

11. Apparatus for filling receptacles according to claim 10 in which said rod and tube are telescopically arranged with said rod and tube threadedly engaged with each other for relative axial movement.

12. Apparatus for filling receptacles comprising a tank for holding liquid, a measuring cup having side walls and a bottom rigidly fixed thereto, said side walls defining an open top opposite said bottom, said cup being movable within the tank, a controlled outlet in said cup, a displacement member supported from above said cup and extending into the open top end of said cup, means for moving said cup and displacement member as a single unit into and out of the liquid, and adjustable means outside said tank to fix said displacement member in a selected position in said cup to vary the capacity of said cup.

13. Apparatus according to claim 12 in which said displacement member is supported by a member connected to the top of said displacement member.

14. Apparatus according to claim 12 in which said adjustable means consists of interconnected rods threadedly engaged with each other for axial movement.

15. Apparatus according to claim 14 in which said rods are telescopically arranged.

16. Apparatus according to claim 15 in which said rods have indicia indicating their relative position.

References Cited in the file of this patent
UNITED STATES PATENTS

| | | |
|---|---|---|
| 333,708 | Wood et al. | Jan. 5, 1886 |
| 624,335 | Hucks | May 2, 1899 |
| 1,548,831 | Dupont | Aug. 11, 1925 |
| 1,731,464 | Kantor | Oct. 15, 1929 |
| 1,928,796 | Rue | Oct. 3, 1933 |
| 2,740,560 | Bridge | Apr. 3, 1956 |
| 2,764,333 | Schnehain | Sept. 25, 1956 |